(12) United States Patent
Hamada

(10) Patent No.: US 7,876,676 B2
(45) Date of Patent: Jan. 25, 2011

(54) NETWORK MONITORING SYSTEM AND METHOD CAPABLE OF REDUCING PROCESSING LOAD ON NETWORK MONITORING APPARATUS

(75) Inventor: Tsuneo Hamada, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 194 days.

(21) Appl. No.: 12/232,891

(22) Filed: Sep. 25, 2008

(65) Prior Publication Data

US 2009/0086630 A1     Apr. 2, 2009

(30) Foreign Application Priority Data

Sep. 28, 2007   (JP) .............................. 2007-255239

(51) Int. Cl.
  *G01R 31/08* (2006.01)
(52) U.S. Cl. ...................................... 370/230
(58) Field of Classification Search ......... 370/230–240; 726/1, 13, 22–30
  See application file for complete search history.

(56) References Cited

U.S. PATENT DOCUMENTS

2005/0018618 A1* 1/2005 Mualem et al. ............. 370/252

2006/0171217 A1   8/2006   Ward

FOREIGN PATENT DOCUMENTS

| JP | 10-303926 A   | 11/1998 |
| JP | 2005-073093 A | 3/2005  |
| JP | 2006-041969 A | 2/2006  |
| JP | 2006-165877 A | 6/2006  |

* cited by examiner

*Primary Examiner*—Kwang B Yao
*Assistant Examiner*—Tung Q Tran
(74) *Attorney, Agent, or Firm*—Rabin & Berdo, P.C.

(57) ABSTRACT

A network monitoring system capable of effectively monitoring the behavior of traffic through a network is provided with an aggregation apparatus which is connected to access networks which is connected to a telecommunications network. The aggregation apparatus includes: a receiving unit distinctively receiving input side communication data which is input from the telecommunications network to one of the access network and output side communication data which is output from one of the access network to the telecommunications network; and an abnormal traffic detecting unit detecting abnormal traffic on the basis of both the input side communication data and the output side communication data.

10 Claims, 19 Drawing Sheets

| 76a | 76b | 76c | 76d |
|---|---|---|---|
| 0 | | pps/bps | permit |
| 1 | | pps/bps | deny |
| 2 | | pps/bps | permit |
| 3 | | pps/bps | permit |
| 4 | | pps/bps | deny |
| 5 | | pps/bps | permit |
| ⋮ | ⋮ | ⋮ | ⋮ |
| n | | pps/bps | permit |

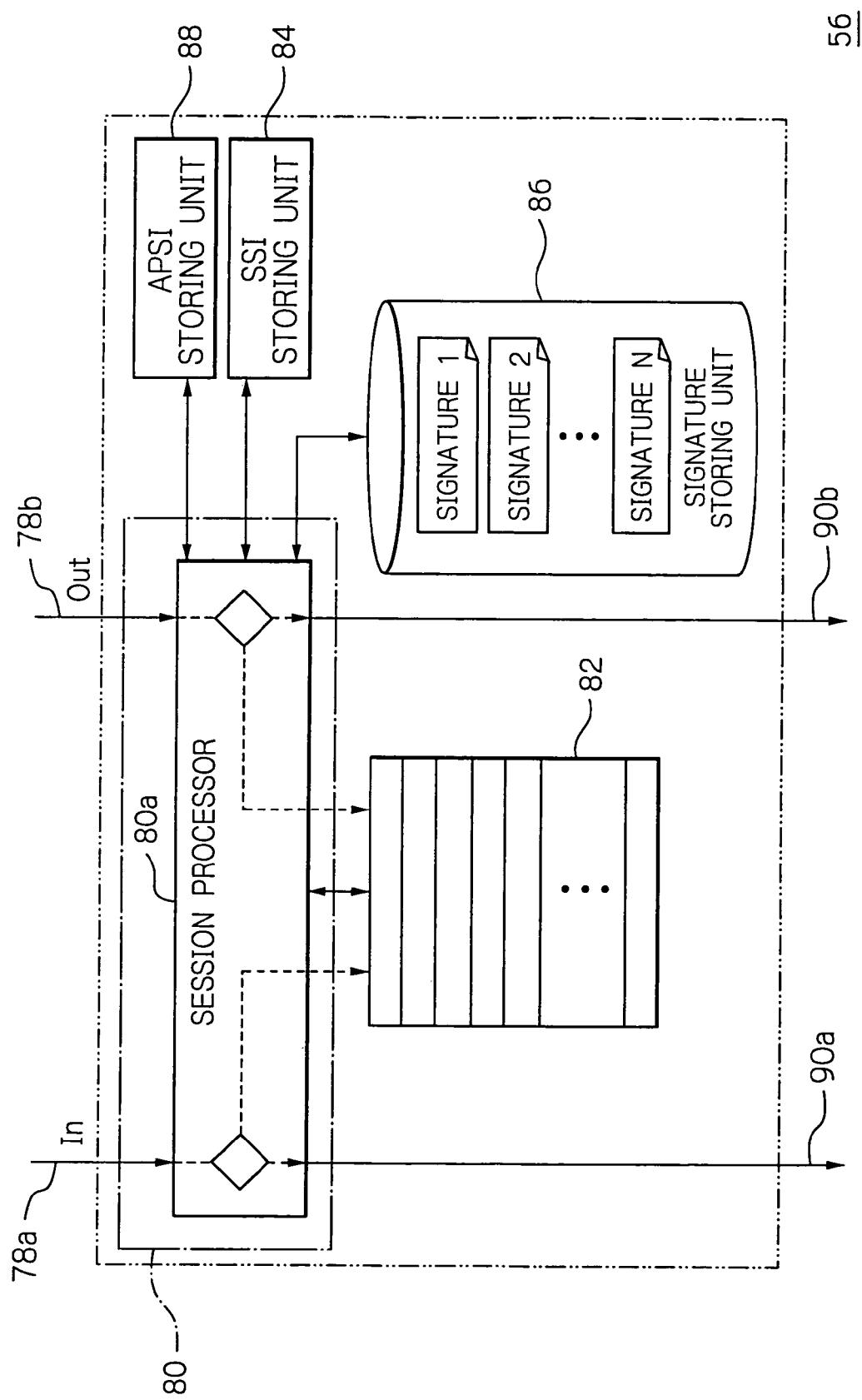

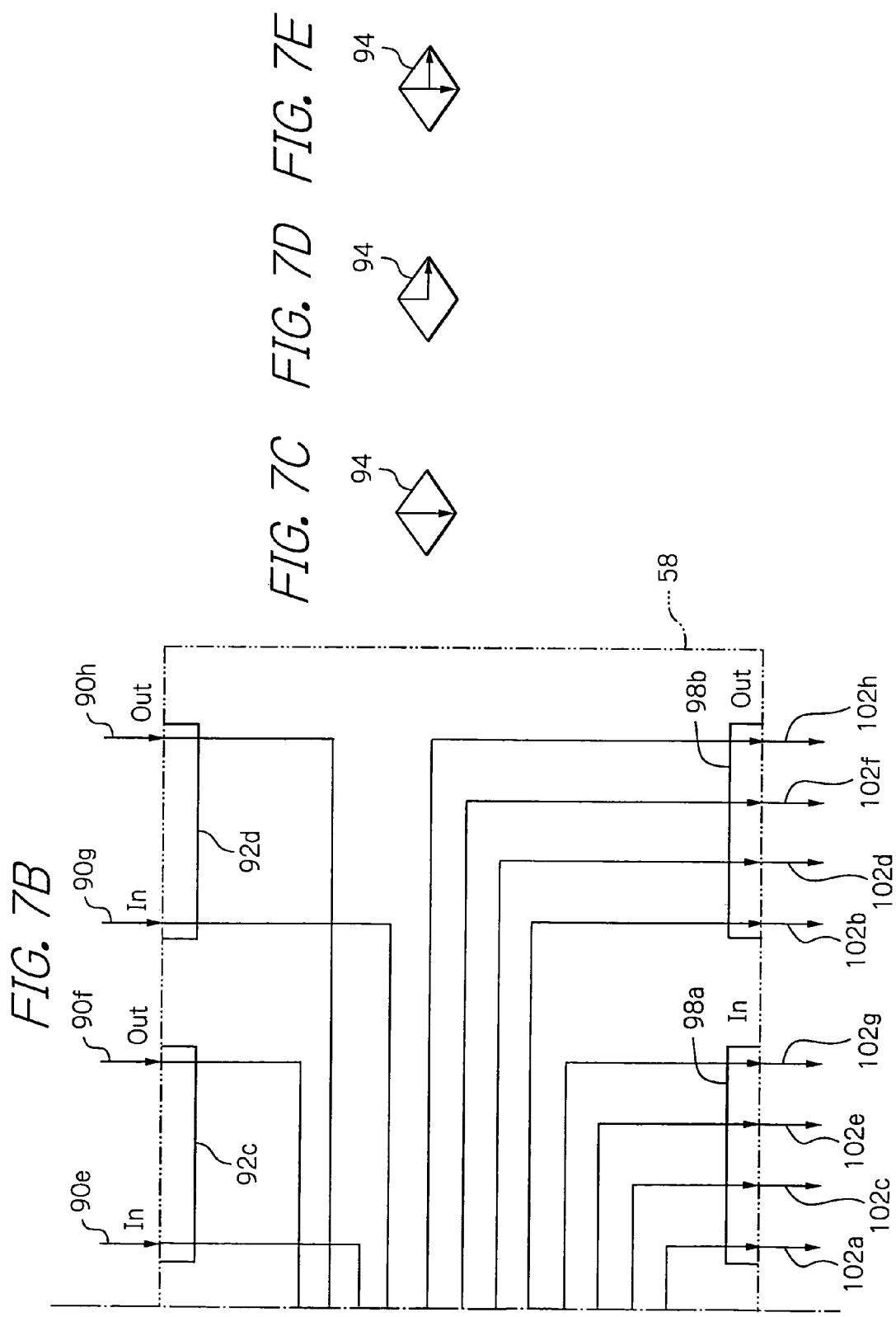

| SOURCE IP | VLAN-ID | REDUNDANT FLAG |
|---|---|---|
| 10.2.100.30 | 2 | 0 |
| 10.2.100.51 | 4 | 1 |
| 10.2.100.51 | 2 | 1 |
| 123.4.5.5 | 3 | 0 |
| 123.4.5.6 | 3 | 0 |
| 192.168.1.2 | 1 | 0 |
| 200.10.10.10 | 4010 | 0 |
| ⋮ | | |

| EXTRA TAG | OUTPUT PORT |
|---|---|
| 0 | D.C |
| 1 | (2) |

230

| VLAN-ID | OUTPUT PORT |
|---|---|
| 0 | (1) |
| 1 | (2) |
| 2 | (1),(2) |
| 3 | (2) |
| ⋮ | ⋮ |
| 4095 | (1),(2) |

232

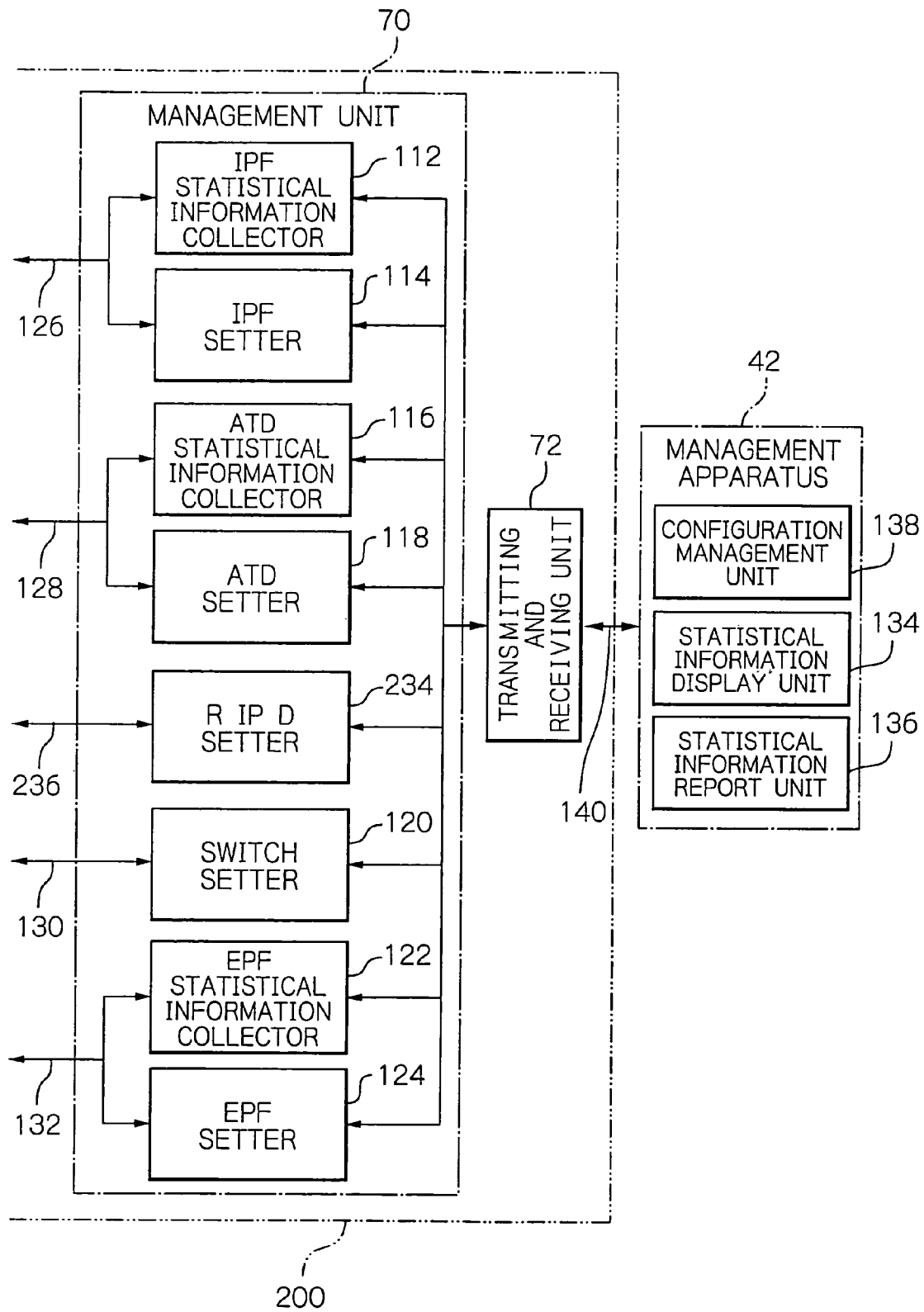

NETWORK MONITORING SYSTEM AND METHOD CAPABLE OF REDUCING PROCESSING LOAD ON NETWORK MONITORING APPARATUS

BACKGROUND OF THE INVENTION

1. Field of the Invention

The present invention relates generally to a network monitoring system, and more particularly to such a system capable of reducing the processing load on a network monitoring apparatus. The present invention also relates to a network monitoring method therefor.

2. Description of the Background Art

Along with the popularization of telecommunications networks, such as the Internet, it becomes usual to use the technique of monitoring network traffic. For example, U.S. patent application publication No. US 2006/0171217 A1 to Ward discloses a technique for implementing the method of reducing the number of measurement systems installed for effectively monitoring a network by deframing data from lower speed lines, and reframing and multiplexing the deframed data into a stream of data carried on a higher speed line.

In the case where a filter mechanism is provided in the system configuration as described in Ward, while blocking particular packets, it is impossible to detect the behavior of traffic with a filter. Because of this, in the case of the system provided with a filter, it is difficult to effectively blocking so-called DoS (Denial of Service) attacks which disable the server computer by transmitting malicious data or disrupt the network by intentionally increasing the traffic. In such a system, when a DoS attack is done, useless traffic flows into a monitoring apparatus monitoring the network, thus making it difficult to effectively monitor the network.

Also, in the case of the technique described in Ward, although network analyzers can be unified, it is impossible to deal with overlapped IP addresses by the unified network analyzer. For example, in the case of business-oriented VPN (Virtual Private Network), a small ISP (Internet Service Provider), a regionally-oriented CATV (Community Antenna TeleVision) or the like, private IP (Internet Protocol) addresses are allocated specifically to the respective subscribers. In this case, if a monitoring apparatus is simply used, an IP address is redundantly used among the subscribers to cause an interference. When monitoring the traffic passing through the subscribers, a network analyzer, i.e. monitoring apparatus, is connected to the network path through a network tap device. However, in the case where the network analyzer cannot process packets having a redundant IP address, there is a problem that it is impossible to accurately monitor the traffic passing through subscribers.

SUMMARY OF THE INVENTION

It is therefore an object of the present invention to provide a network monitoring system and a method capable of effectively monitoring the behavior of traffic conveyed by a telecommunications network.

In accordance with the present invention, a network monitoring system is connected to an access network which is connected to a telecommunications network, and comprises: a receiving unit for distinctively receiving input side communication data which is input from the telecommunications network to the access network and output side communication data which is output from the access network to the telecommunications network; and an abnormal traffic detecting unit for detecting abnormal traffic on the basis of both the input side communication data and the output side communication data.

In accordance with the above configuration, the input side communication data which is input from the telecommunications network to the access network and the output side communication data which is output from the access network to the telecommunications network can be distinctively received, and thereby abnormal traffic can be detected on the basis of both the input side communication data and the output side communication data. Accordingly, a DoS attack or the like can be detected on the basis of the traffic behavior of packets in the both directions. This makes it possible to prevent useless traffic from flowing in a monitoring apparatus, which is monitoring the network, to accomplish an effective monitoring system.

In accordance with another aspect of the present invention, a network monitoring method comprises: a communication data receiving step of distinctively receiving input side communication data which is input from a telecommunications network to an access network and output side communication data which is output from the access network to the telecommunications network; and an abnormal traffic detecting step of recognizing a session in both the input side communication data and the output side communication data, and detecting abnormal traffic on the basis of the recognized session.

In accordance with the above configuration, the input side communication data which is input from the telecommunications network to the access network and the output side communication data which is output from the access network to the telecommunications network can be distinctively received, and thereby abnormal traffic can be detected by recognizing sessions in the input and output side communication data. Accordingly, a DoS attack or the like can be detected on the basis of the traffic behavior of packets in the both directions. This makes it possible to prevent useless traffic from flowing in a monitoring apparatus, which is monitoring the telecommunications network, to realize an effective monitoring system.

BRIEF DESCRIPTION OF THE DRAWINGS

The objects and features of the present invention will become more apparent from consideration of the following detailed description taken in conjunction with the accompanying drawings in which:

FIG. 5 is a schematic block diagram showing the configuration of the functional blocks of abnormal traffic detecting units in accordance with the illustrative embodiment;

FIGS. 7A and 7B are, when combined as shown in FIG. 7, a schematic diagram showing a specific configuration of a switch unit in the aggregation apparatus shown in FIG. 2;

FIGS. 7C, 7D and 7E show some example of the state of switch elements of the switch unit shown in FIGS. 7A and 7B;

FIG. 16 is a schematic block diagram showing a specific configuration of the management unit shown in FIGS. 10A and 10B and a specific configuration of the management apparatus shown in FIG. 9.

DESCRIPTION OF THE PREFERRED EMBODIMENTS

Figure 1:
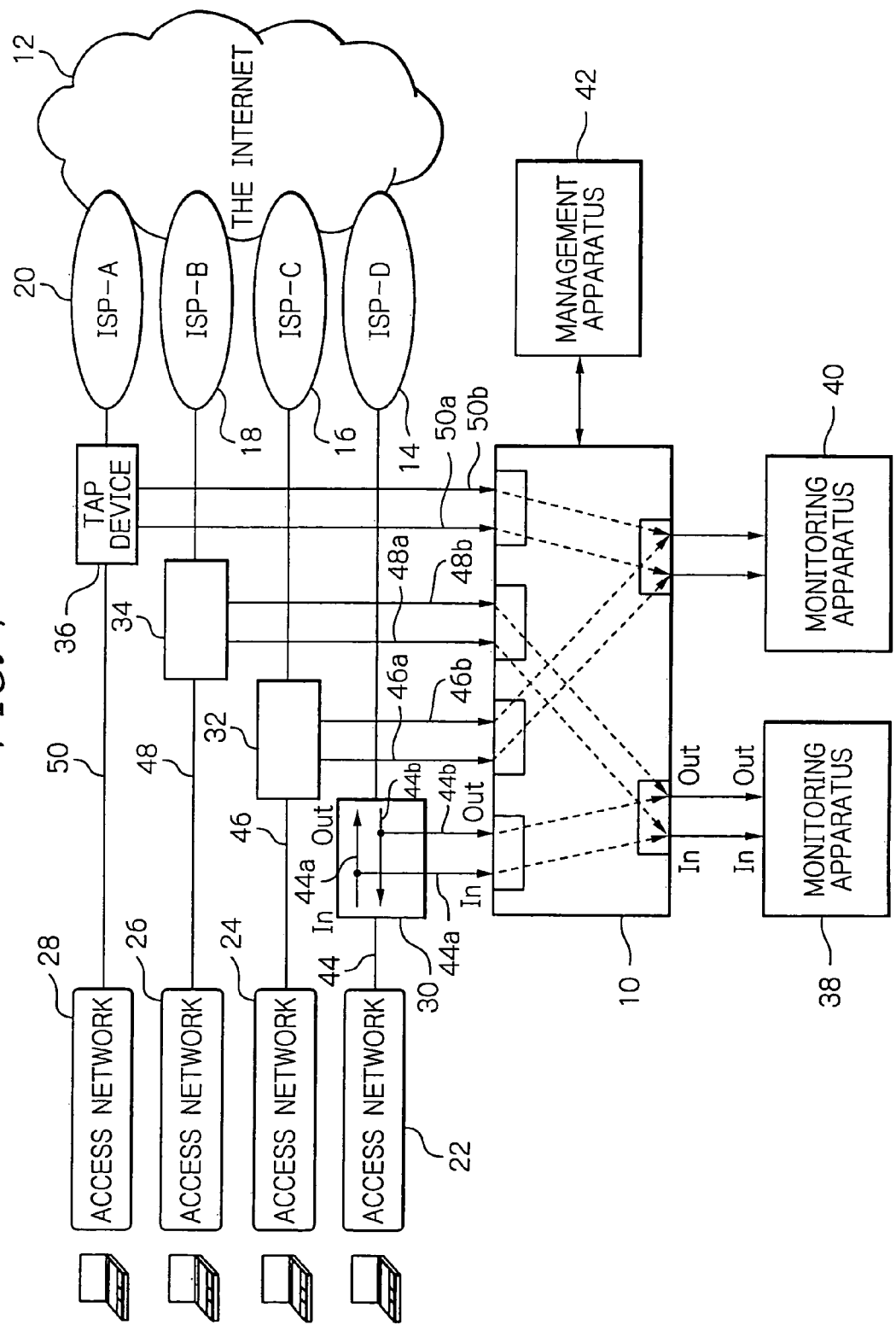
FIG. 1 is a schematic block diagram showing a specific network configuration to which an aggregation apparatus in accordance with the present invention is connected.

With reference to the accompanying drawings, a preferred embodiment of the present invention will be described in detail. Like elements or components are designated with the reference numerals, and therefore no redundant description will be repeated.

First, an illustrative embodiment of the present invention will be described, with reference to FIG. 1, which is a schematic block diagram showing the configuration of an aggregation apparatus 10 of the embodiment installed to be connected to a telecommunications network 12 such as the Internet. In this example shown in FIG. 1, there are ISPs (Internet Services Providers) 14, 16, 18 and 20, access networks 22, 24, 26 and 28, network tap devices 30, 32, 34 and 36, an aggregation apparatus 10, monitoring apparatuses 38 and 40, and a management apparatus 42. In the description, signals are indicated with reference numerals of connections on which they are conveyed.

Figure 2:
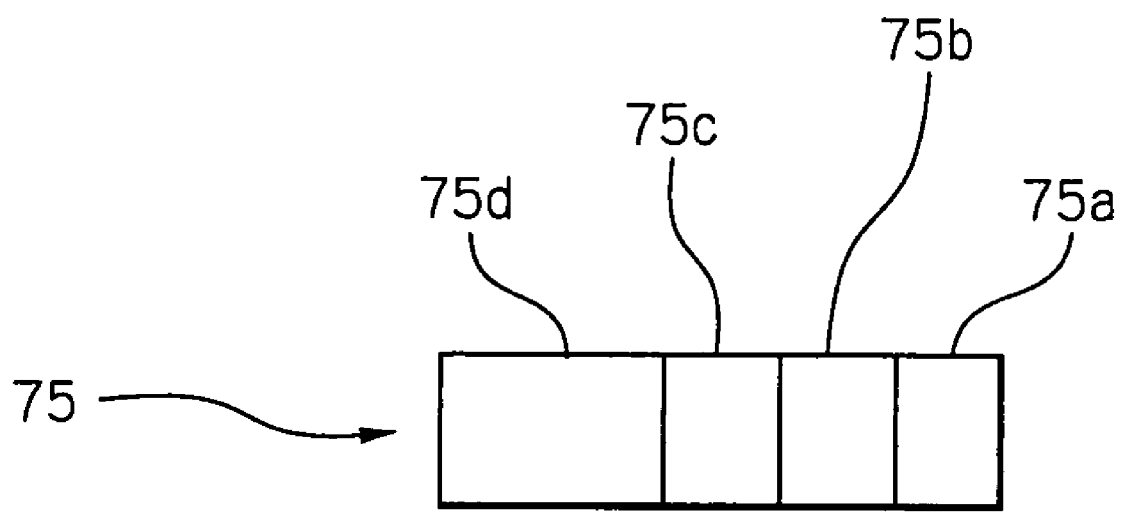
FIG. 2 schematically shows a specific configuration of a packet to be processed by the aggregation apparatus according to the invention.

Each of the network tap devices 30, 32, 34 and 36 intervenes between one of the access networks and corresponding one of the ISPs in order to branch the communication signal lines. A packet 44 transmitted from the access network 22 to the ISP 14 is extracted and supplied to the aggregation apparatus 10 as an input side packet 44a over the line branched from the input side, i.e. the access network 22 side. The packet 44 transmitted from the ISP 14 to the access network 22 is also extracted and supplied to the aggregation apparatus 10 as an output side packet 44b over the line branched from the output side, i.e. the ISP 14 side. The other tap devices 32, 34 and 36 also work in a similar way to supply the aggregation apparatus 10 with input and output side packets 46a and 46b, 48a and 48b, and 50a and 50b, respectively. FIG. 2 shows a specific configuration of a packet 75 transmitted between the access network and the ISP. As seen from the figure, the packet 75 includes Ethernet (trade name) or MAC (Media Access Control) headers 75a, IP (Internet Protocol) headers 75b, TCP/UDP (Transmission Control Protocol/User Datagram Protocol) headers 75c, and payload 75d.

Figure 3A:
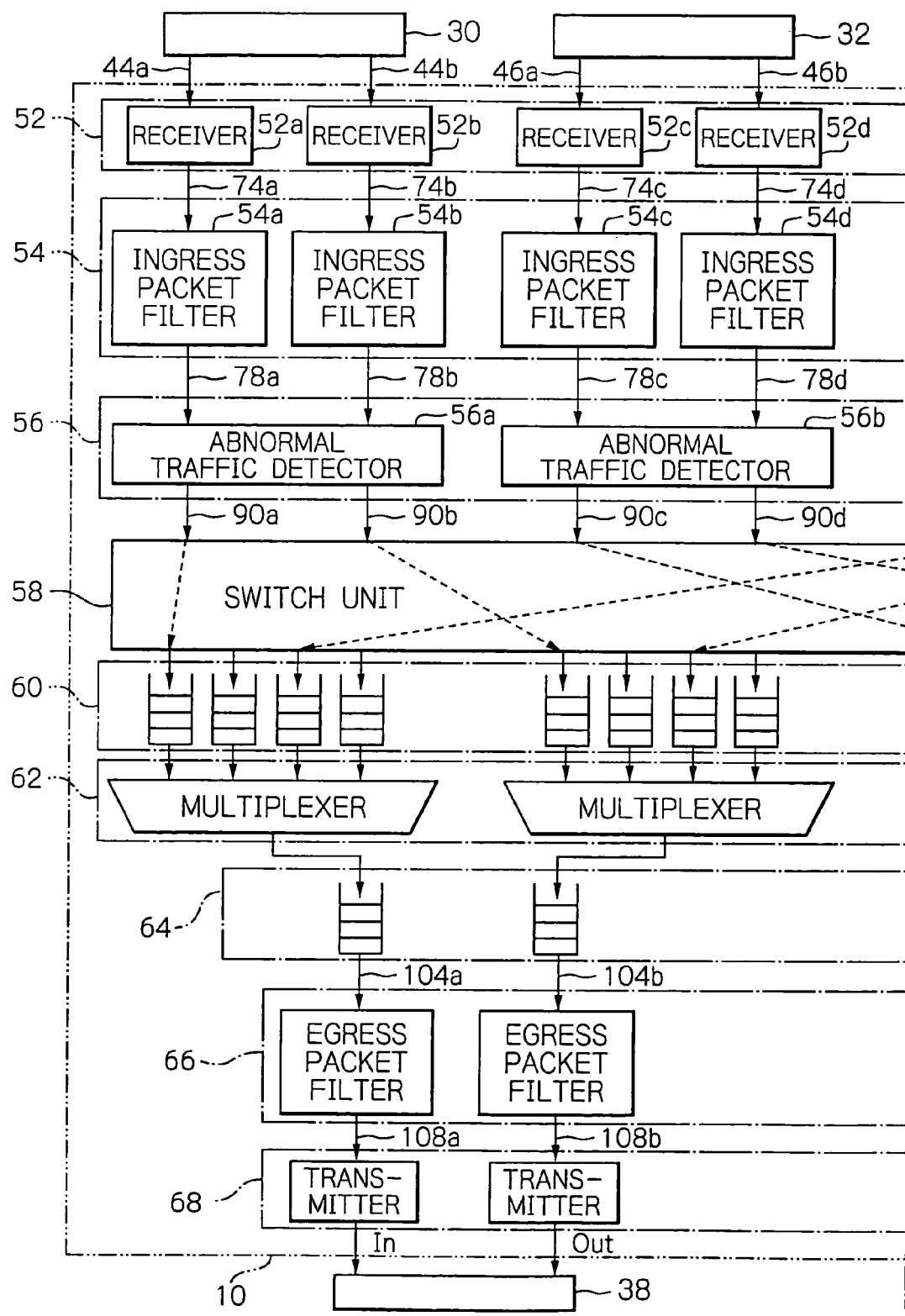
FIGS. 3A and 3B are, when combined as shown in FIG. 3, a schematic block diagram showing a specific configuration of the aggregation apparatus shown in FIG. 1.
Figure 3B:
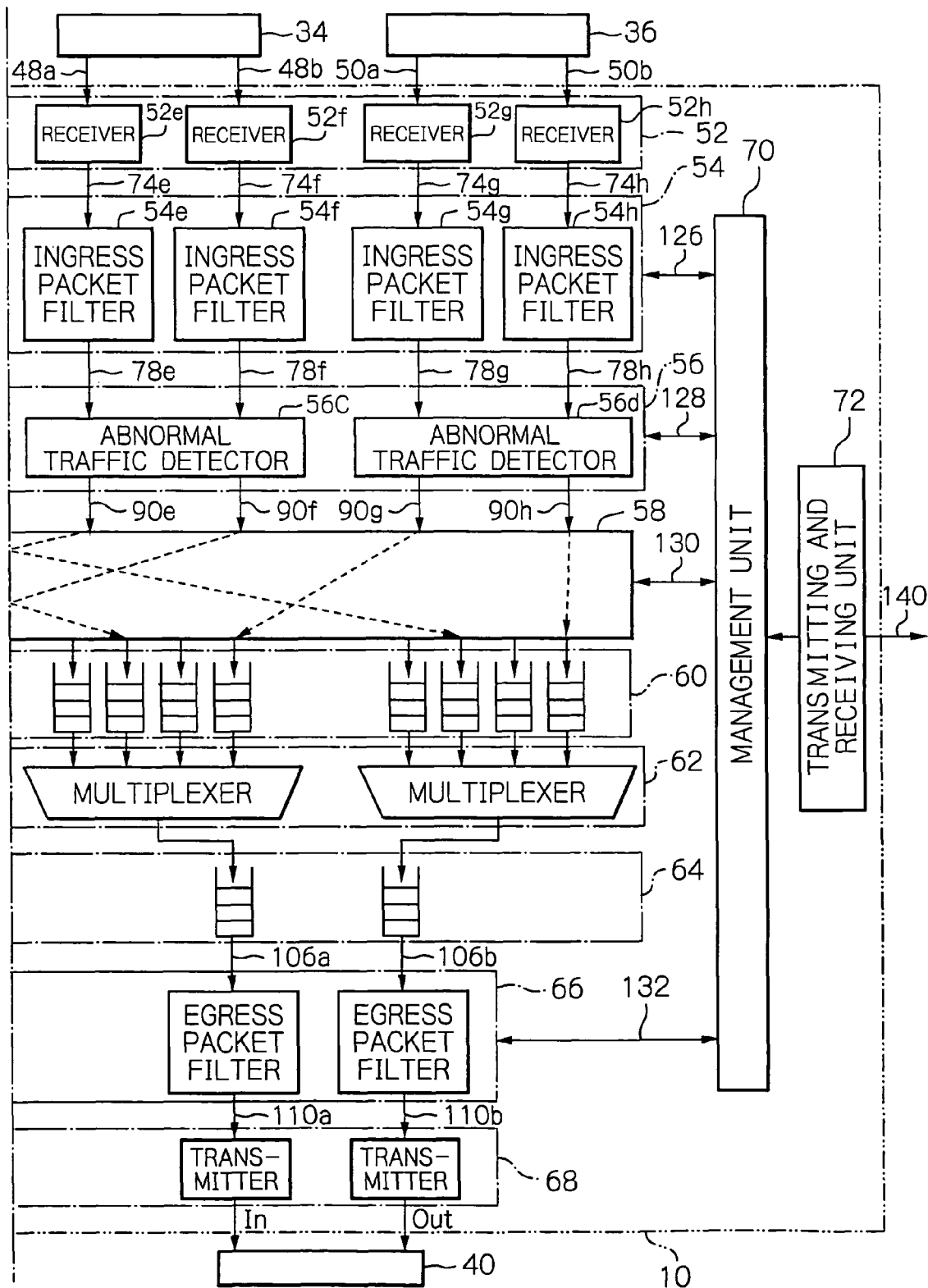

The aggregation apparatus 10 is adapted for receiving an input and an output side signal from each network tap device. FIGS. 3A and 3B are a schematic block diagram showing a specific configuration of an embodiment of the aggregation apparatus 10. As seem from the figure, the aggregation apparatus 10 includes a receiving unit 52, an ingress packet filtering unit 54, an abnormal traffic detecting unit 56, a switch unit 58, a switch unit side memory unit 60, a multiplexer unit 62, an egress packet filter side memory unit 64, an egress packet filtering unit 66, a transmitting unit 68, a management unit 70, and a transmitting and receiving unit 72. Some of the functional parts, such as the ingress packet filtering unit 54, the abnormal traffic detecting unit 56, the switch unit 58 and the egress packet filtering unit 66, are controlled by the management apparatus 42 via the management unit 70.

The receiver 52 includes pairs of receiver 52a and 52b, 52c and 52d, 52e and 52f, and 52g and 52h, so as to receive separately an input side signal and an output side signal from the respective network tap devices. The receivers 52a, 53c, 53e and 53g respectively receive the input signals 44a, 46a, 48a and 50a. The receivers 52b, 52d, 52f and 52h respectively receive the output signals 44b, 46b, 48b and 50b. The input signals 44a, 46a, 48a and 50a are supplied to the ingress packet filtering unit 54 as input side packets 74a, 74c, 74e and 74g, respectively. The output signals 44b, 46b, 48b and 50b are supplied to the ingress packet filtering unit 54 as output side packets 74b, 74d, 74f and 74h, respectively.

Figure 4:
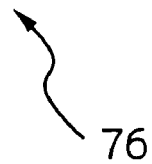
FIG. 4 shows packet filtering table data for determining the filtering rules of the filters in the ingress or egress packet filtering unit in accordance with the embodiment of the invention.

The ingress packet filtering unit 54 is adapted to extract the identifiers of the packets, which are received through the respective network tap devices 30, 32, 34 and 36, such as Ethernet headers (MAC headers) 75a, IP headers 75b, and TCP/UDP headers 75c, and searching for the identifiers based on which filtering can be performed. The ingress packet filtering unit 54 includes pairs of ingress packet filters 54a and 54b, 54c and 54d, 54e and 54f, and 54g and 54h. The filters 54a, 54c, 54e and 54g receive the input side packets 74a, 74c, 74e and 74g, respectively. The filters 54b, 54d, 54f and 54h receive the output side packets 74b, 74d, 74f and 74h, respectively. With reference to FIG. 4, it will be described how the filters in the filtering unit 54 filter the packets. FIG. 4 shows a packet filtering table 76 determining the filtering rules of the filters.

The packet filtering table 76 shown in FIG. 4 includes a priority field 76a, a policy rule field 76b, a statistical field 76c and an action field 76d. The policy rule field is used to set a policy rule relating to the identifiers of Ethernet headers, IP headers, and TCP/UDP header such as VLAN-ID (Virtual Local Area Network-IDentification), Ethernet priority, Ethernet type, destination IP address, sender IP address, TOS (Type Of Service), protocol number, TCP flag, destination port number, sender port number and so forth. When receiving a packet, a policy rule corresponding to the identifiers of the packet is searched for to determine the packet permitted or denied to pass the filter based on the action in accordance with the policy rule. Mask bits for each identifier are entered to the policy rule field for searching for a numerical range.

The priority field 76a is used to represent an ordering of priority of the policy rules. When hitting a plurality of policy rules corresponding to the identifiers of a packet, the action in accordance with the policy rule having the highest priority is performed. In this figure, smaller number shows higher priority.

The statistical field 76c is used to register the number (pps: packet per second) of the packets hitting some policy rule and their total volume (bps: byte per second) as a packet counter and a byte counter of the policy rule, respectively.

The input side packets which have passed the filters 54a, 54c, 54e and 54g are supplied to the abnormal traffic detecting unit 56 as input side packets 78a, 78c, 78e and 78g, respectively. The output side packets which have passed the filters 54b, 54d, 54f and 54h are supplied to the abnormal traffic detecting unit 56 as output side packets 78b, 78d, 78f and 78h, respectively.

The abnormal traffic detecting unit 56 is adapted for recognizing each session between the access networks and the IPSs by processing packets of both the input and output side signals through the ingress packet filtering unit 54 in order to detect abnormal traffic in each session. With reference to FIGS. 3A, 3B and 5, the operation in the abnormal traffic detecting unit 56 will be described below. The abnormal traffic detecting unit 56 includes abnormal traffic detectors 56a, 56b, 56c and 56d, as shown in FIGS. 3A and 3B. FIG. 5 is a schematic block diagram showing in more detail a specific configuration of an embodiment of the abnormal traffic detecting unit 56. As seen from the figure, the abnormal traffic detecting unit 56 includes a session processing unit 80, a session management table 82, a session statistical information (SSI) storing unit 84, a signature storing unit 86, and an abnormal packet statistical information (APSI) storing unit 88. The session processing unit 80 includes a plurality (n) of session processors 80a, 80b, 80c and 80d, although only one processor 80a is shown in this figure.

Each session processor is adapted for receiving and processing both input and output side packets which are transferred from the ingress packet filtering unit 54. The session processors 80a, 80b, 80c and 80d respectively receive the packets 74a and 74b, 74c and 74d, 74e and 74f, and 74g and 74h, and then process these packets in order to detect abnormal traffic in each session.

The session management table 82 stores information according to each session such as destination IP addresses, sender IP addresses, protocol numbers, destination port numbers, and sender port numbers of the input and output side packets of the session now acquired.

The session statistical information storing unit 84 is adapted for storing information according to the number of sessions for each combination of a destination IP address and a sender IP address, which session has been registered in the session management table 82 and in progress.

The signature storing unit 86 is adapted for storing signatures representing patterns of abnormal packets. For example, an IP packet is determined as an abnormal packet by the signature matching if the destination IP address is equal to the sender IP address, if the destination IP address is modified, if the size of the IP packet exceeds a predetermined maximum length when the IP packet is reconstructed at the destination end, or the like.

The abnormal packet statistical information storing unit 88 is adapted for storing the number of abnormal packets for each signature.

Figure 6A:
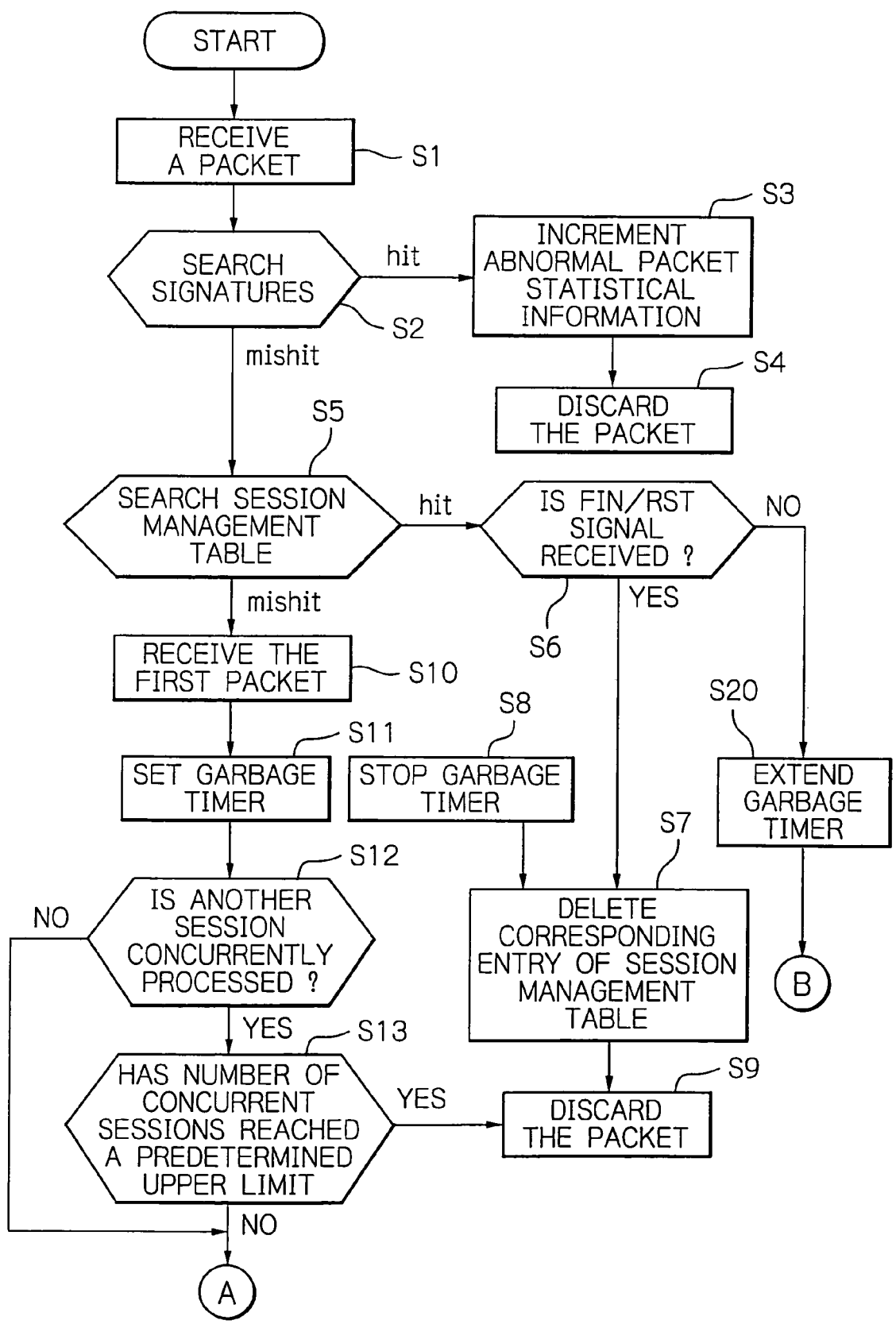
FIGS. 6A and 6B area flow chart useful for understanding the session process in the abnormal traffic detecting units.
Figure 6B:
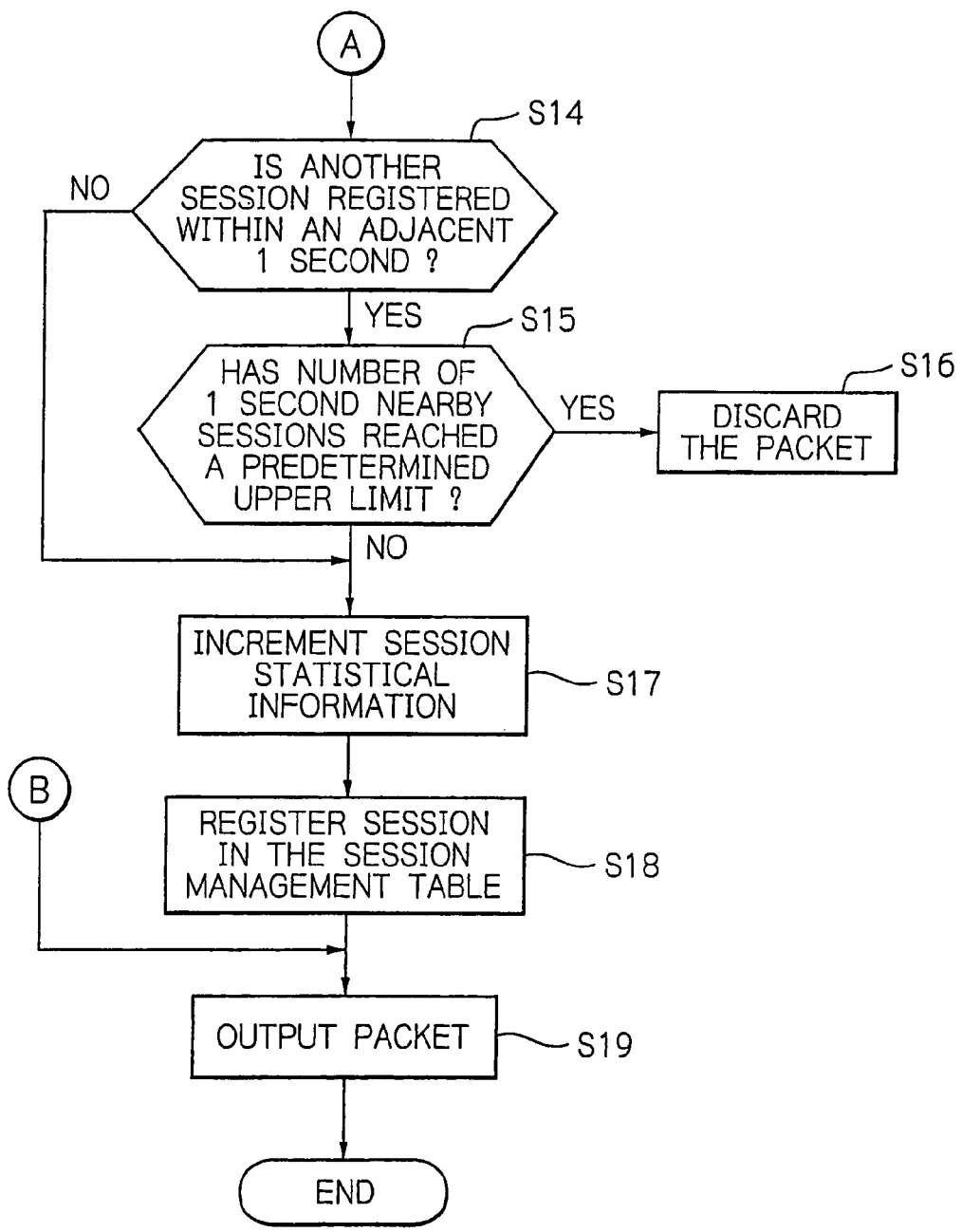

With reference to FIGS. 6A and 6B, the process in the session processing unit 80 will be described below. FIGS. 6A and 6B are a flow chart showing a specific process sequence of an embodiment of the abnormal traffic detecting unit 56. First, a packet is input to the session processing unit 56 (step S1). The signature of the packet is recognized and the signature storing unit 86 is searched for a signature corresponding thereto. When a signature is hit (hit), the number of the abnormal packets stored in the abnormal packet statistical information storing unit 88 is incremented (step S3) and the packet is discharged (step S4).

When no signature is hit (mishit), the session management table 82 is searched for information in accordance with the packet to know whether or not the session of the packet is acquired (step S5). When information is hit (hit), it is determined whether or not the abnormal traffic detecting unit receives a FIN/RST signal for the session (step S6). If its FIN/RST signal is received (yes), information in accordance with the packet in the session management table 82 is deleted in response to a garbage timer interrupt signal for interrupting the session (step S8). Thereafter, the packet is discharged (step S9).

On the other hand, when no information is hit in the session management table 82 in step S5 (mishit), a first packet of the session is received and then a garbage timer for the session is set (step S11). Then it is determined whether or not there is another registered session which is concurrently processed (step S12). If there is another session concurrently processed (yes), it is determined whether or not the number of sessions concurrently processed has reached a predetermined upper limit (step S13). If it is determined that the number has reached the upper limit (yes), the packet is discharged (step S9). On the other hand, if it is determined in step S13 that the number did not reach the upper limit (no) or in step S12 that there is no session registered in the session management table 82 (no), it is determined whether or not there is another session registered in an adjacent one second (step S14). If it is determined that there is another session (yes), it is then determined whether or not the number of session in the adjacent one second has reached the predetermined upper limit (step S15). If it is determined that the number has reached the upper limit (yes), the packet is discharged (step S16).

On the other hand, if it is determined in step S15 that the number did not reach the predetermined upper limit (no), or in step S14 that there is no other session in the adjacent one second (no), the number registered in the session statistical information storing unit 84 is incremented (step S17). Then the session is registered in the session management table (step S18) and the packet is output (step S19). After outputting the packet in step S19, the process is terminated (END).

If it is determined that the FIN/RST signal is not received in step S6, the term set by the garbage timer is extended (step S20) and the packet is output (step S19).

The packets 78a, 78b, 78c, 78d, 78e, 78f, 78g and 78h through the abnormal traffic detecting unit 56 are supplied to the switch unit 58 as packets 90a, 90b, 90c, 90d, 90e, 90f, 90g and 90h, respectively.

Figure 7A:
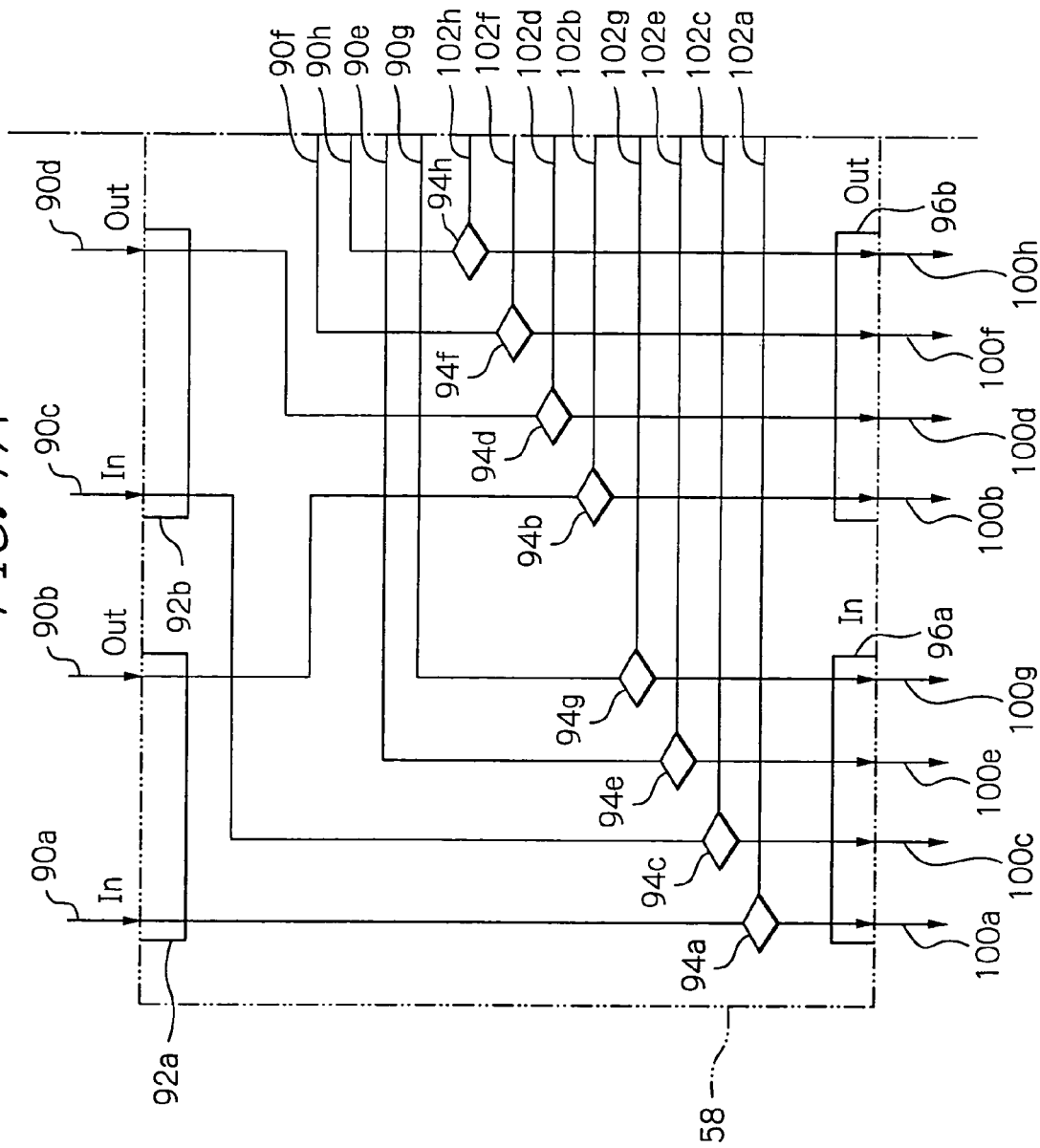

The switch unit 58 is adapted for switching the output direction of the packets supplied from the abnormal traffic detecting unit 56. FIGS. 7A and 7B are a schematic diagram showing a specific configuration of an embodiment of the switch unit 58. The switch unit 58 includes input ports 92a, 92b, 92c and 92d to the access networks side; switch elements 94a, 94b, 94c, 94d, 94e, 94f, 94g and 94h, which will be sometimes indicated with a common reference numeral 94; and pairs of output ports 96a and 96b, and 98a and 98b to the monitoring apparatuses side. The input ports 92a, 92b, 92c and 92 respectively serves the packets 90a, 90c, 90e and 90g as input side packets, and also serves the packets 90b, 90d, 90f and 90h as output side packets.

The switching elements are adapted for switching the output direction by changing their switching states. Some examples of the states of the switch element 94 are shown in FIGS. 7C, 7D and 7E, as states 1, 2 and 3, respectively. When the switch element 94a is set into the state 1, the packet 90a supplied from the input port 92a is transmitted to the output port 96a as an input packet 100a. When it is set into the state 2, the packet 90a is transmitted to the output port 98a as an input packet 102a. When it is set into the state 3, which is called "mirroring state", the packet 90a is transmitted to the output ports 96a and 98a as input packets 100a and 102a, respectively. The other switch elements operate in a similar way.

The input side packets 90a, 90c, 90e and 90g through their switch elements are supplied to the output ports 96a and/or 98a as input side packets 100a and/or 102a, 100c and/or 102c, 100e and/or 102e, and 100g and/or 102g, respectively. The output side packets 90b, 90d, 90f and 90h are supplied to the output ports 96b and/or 98b as output side packets 100b and/or 102b, 100d and/or 102d, 100f and/or 102f, and 100h and/or 102h, respectively.

The input side packets through the switch unit 58 are supplied to the switch unit side memory unit 60 and temporarily stored in it. These packets stored in the memory unit 60 are extracted in a round-robin fashion to be supplied to the multiplexer unit 62.

The multiplexer unit 62 is adapted for multiplexing the packets on the same output ports of the switch unit 58 and serializing these multiplexed packets. The packets on the output ports 96a and 98a are respectively transferred to the egress packet filtering unit side memory unit 64 in the form of input packets 104a and 106a via the multiplexer unit 62. The packets through the output ports 96b and 98b are respectively transferred to the egress packet filtering unit side memory unit 64 in the form of output packets 104b and 106b. These packets 104a, 104b, 106a and 106b are supplied to the egress packet filtering unit 66.

The egress packet filtering unit 66 is adapted for filtering on the basis of the identifiers of the headers of the packets in the same manner as the ingress packet filtering unit 54. When the packets 104a, 104b, 106a and 106b can pass through the egress packet filtering unit 66, they are respectively transmitted through the transmitter unit 68 as packets 108a, 108b, 110a and 110b.

The packets 108a and 108b are inputted to the monitoring apparatus 38 and the packets 110a and 110b are inputted to the monitoring apparatus 40.

Figure 8:
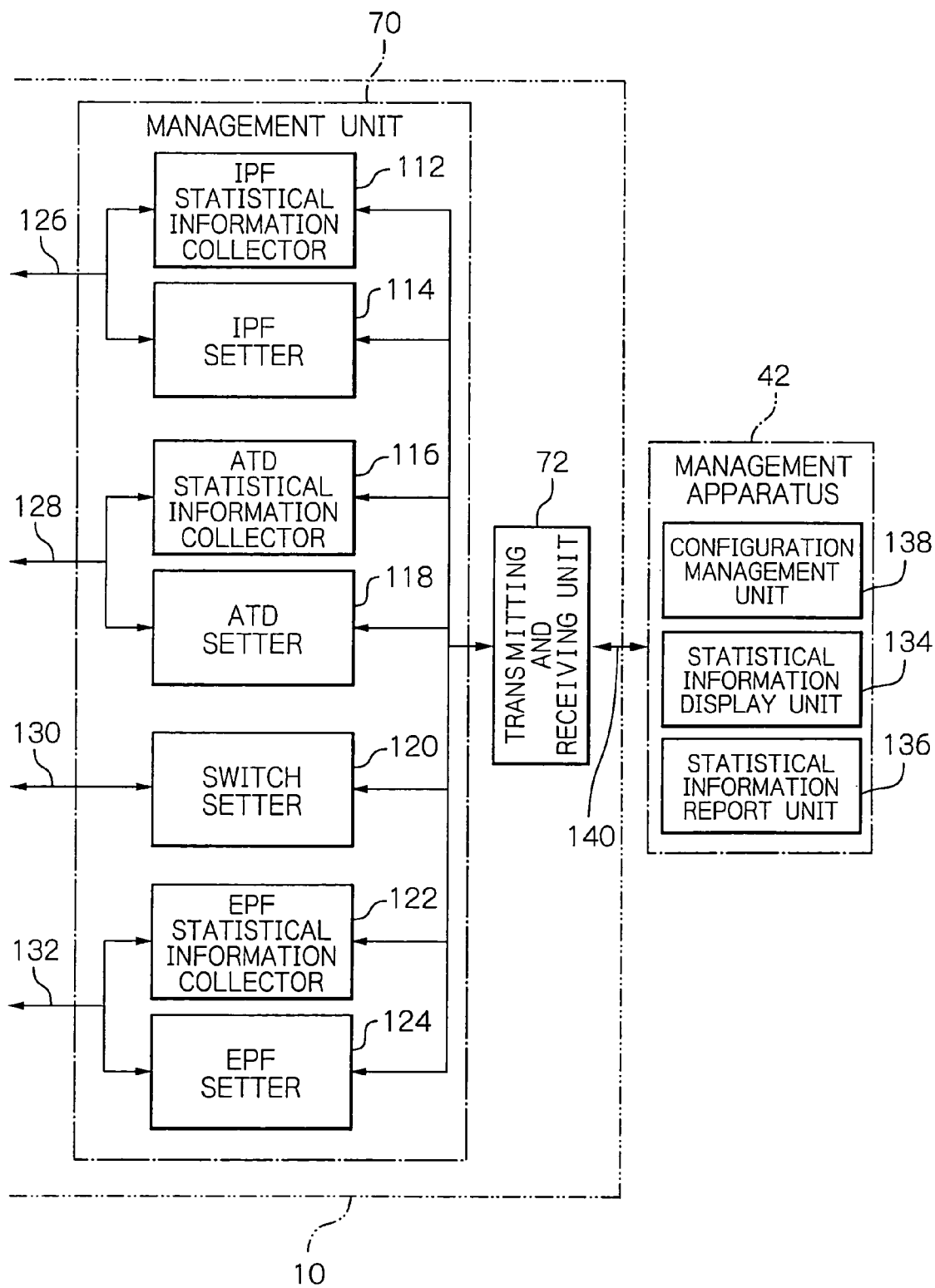
FIG. 8 is a schematic block diagram showing a specific configuration of the management unit shown in FIG. 2 and the management apparatus shown in FIG. 1.

FIG. 8 is a schematic diagram showing a specific configuration of an embodiment of the management unit 70. The management unit 70 includes an statistical information collector 112 and a setter 114 associated with the ingress packet filtering (IPF) units 54, sometimes referred to IPF setter 114; a statistical information collector 116 and a setter 118 associated with the abnormal traffic detecting (ATD) units 56, sometimes referred to ATD setter 118; a switch setter 120 associated with the switch unit 58; and a statistical information collector 122 and a setter 124 associated with the egress packet filtering (EPF) units 66, sometimes referred to EPF setter 124.

These collectors and setters 112, 114, 116, 118, 120, 122 and 124 are adapted for receiving information supplied to them and converting the internal formats of the respective information items to appropriate formats which can be used in the management apparatus 43 and vice versa. The information formats for use in the management apparatus 42 may be character formats, MIB (Management Information Base) formats or the like.

The statistical information collectors 112, 116, 122 respectively deal with statistical information 126, 128, and 132 in accordance with the ingress packet filtering unit 54, the abnormal traffic detecting unit 56 and the egress packet filtering unit 66. The setters 114, 118, 120 and 124 respectively deal with setting information 126, 128, 130 and 132 in accordance with the ingress packet filtering unit 54, the abnormal traffic detecting unit 56 and the egress packet filtering unit 66.

The management apparatus 42 is adapted for receiving information 140 from the management unit 70 via the transmitting and receiving unit 72. The management apparatus includes a statistical information display unit 134, a statistical information report unit 136 and a configuration management unit 138. The statistical information display unit 134 is adapted for collecting statistical information 140 converted from information 126, 128 and 132 from the management unit 70 and displaying the statistical information in a line chart (waveform). The statistical information report unit 136 is adapted for accumulating the waveforms displayed by the statistical information display unit 134. The configuration management unit 138 is adapted for accumulating setting information in accordance with the ingress packet filtering unit 54, the abnormal traffic detecting unit 56 and the egress packet filtering unit 66, and for supplying the setting information 140 to each setter 114, 118, 120 or 124.

As has been discussed above, in accordance with the present embodiment, the abnormal traffic detecting unit 56 determines, by signature matching, whether or not each of both the input side packets and the output side packets is an abnormal packet. Accordingly, it is possible to discard abnormal packets as a DoS (Denial of Service) attack or the like on the basis of the traffic behavior of packets in the both directions. By this process, even if a DoS attack is done, useless traffic does not flow in the monitoring apparatuses 38 and 40, and thereby the network 12 can be effectively monitored. Also, in the case where abnormal packets are collected by the monitoring apparatuses 38 and 40 in a concentrative manner, it is possible to confirm statistical information of abnormal packets separately for each line even when the destination IP address is modified.

Figure 9:
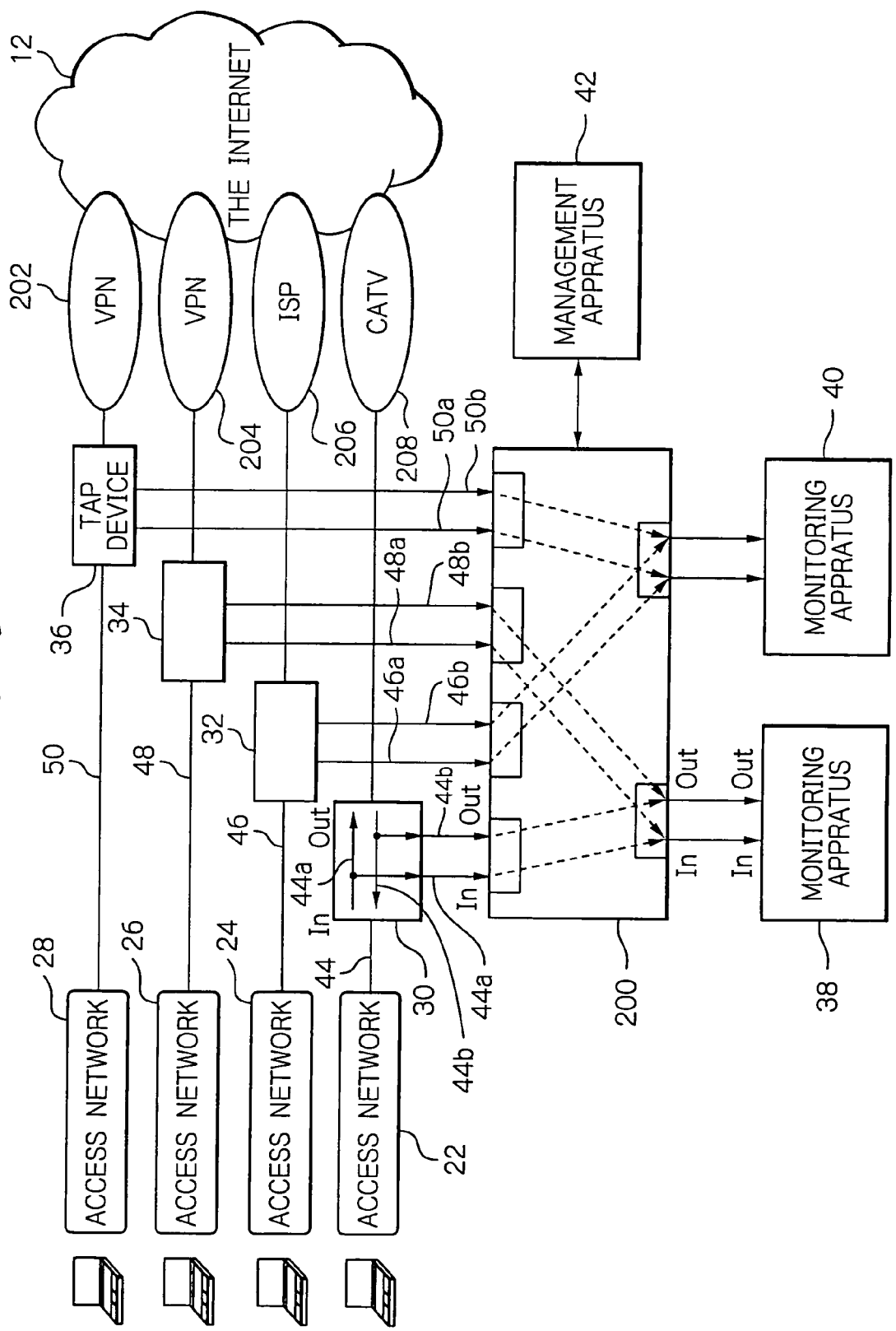
FIG. 9 is a schematic block diagram showing an alternative network configuration to which an aggregation apparatus in accordance with the invention is connected.

An alternative embodiment of the present invention will be described with reference to FIG. 9. This figure is a schematic block diagram showing the configuration of an aggregation apparatus 200 of the alternative embodiment installed to be connected to the network 12. The configuration shown in FIG. 9 is basically similar to FIG. 1. However, whereas the access networks 22, 24, 26 and 28 are connected to the network 12 through the ISPs 14, 16, 18 and 20 in the embodiment shown in FIG. 1, the access networks in the alternative embodiment are connected to the network 12 thorough VPNs (Virtual Private Networks) 202 and 204, an ISP 206 and a CATV (Community Antenna TeleVision) 208.

Figure 10A:
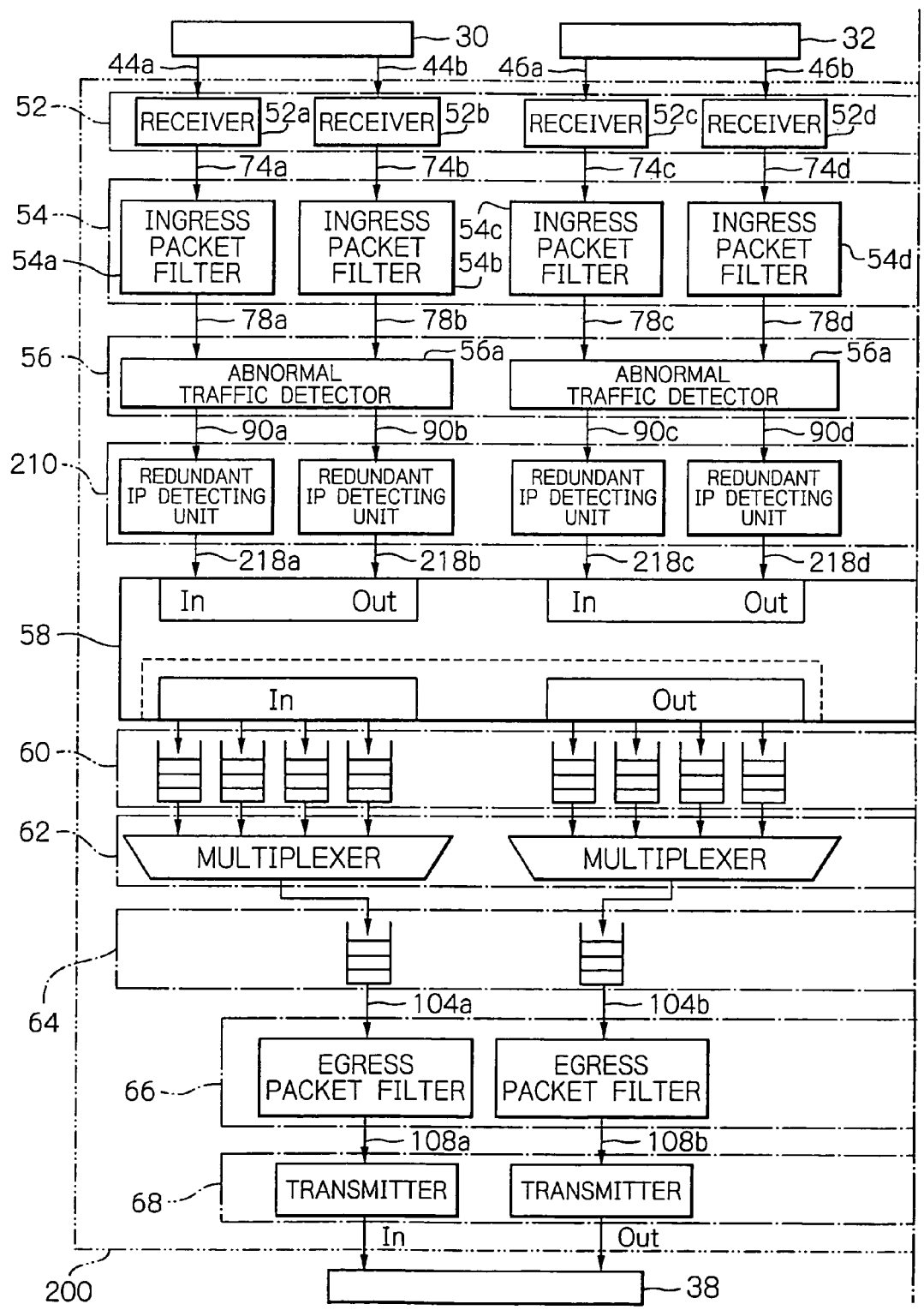
FIGS. 10A and 10B, when combined as shown in FIG. 10, show a specific configuration of the aggregation apparatus in accordance with an alternative embodiment of the invention.
Figure 10B:
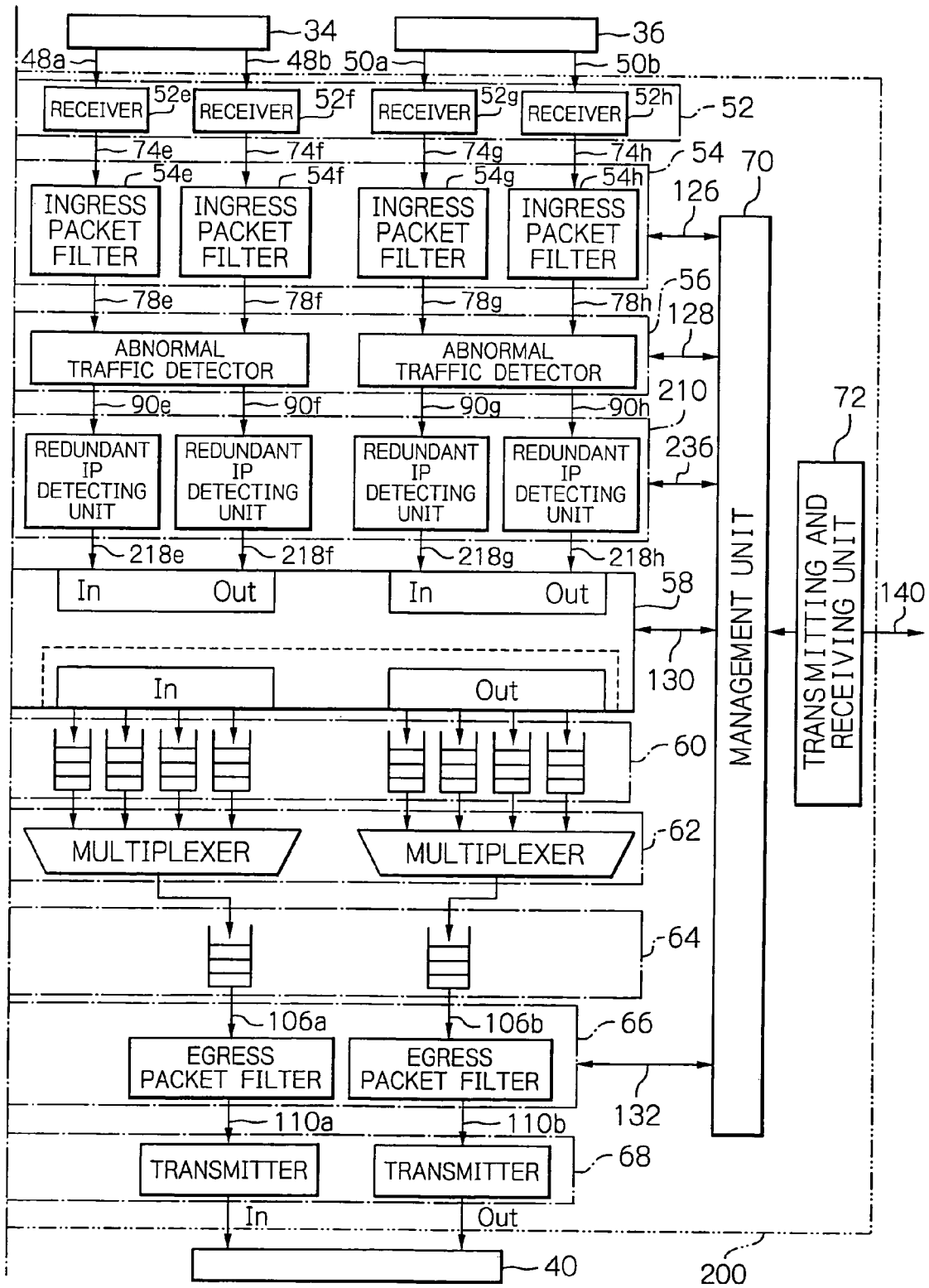

FIGS. 10A and 10B are a schematic block diagram showing a specific configuration of the aggregation apparatus 200 in accordance with the alternative embodiment. The aggregation apparatus 200 may be the same as the apparatus 10 shown in FIGS. 3A and 3B except that a redundant IP detecting unit 210 is provided between the abnormal traffic detecting unit 56 and the switch unit 58. Like components are designated with identical reference numerals.

Figure 11:
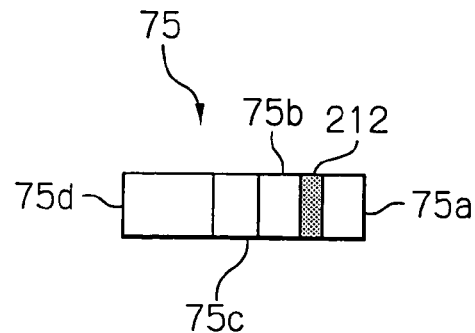
FIG. 11 schematically shows a specific configuration of a packet to be processed by the aggregation apparatus shown in FIGS. 10A and 10B.

FIG. 11 schematically shows an embodiment of a packet to be processed in the embodiment. As seen from the figure, the packet 75 includes information in accordance with their VLAN-ID 212 as shown in FIG. 10, for example. In the abnormal traffic detecting unit 56, the session management table 82 in the alternative embodiment registers VLAN-IDs of the processed sessions in addition to their destination IP addresses, sender IP addresses, protocol numbers, destination port numbers and the sender port numbers. Since the VLAN-IDs are registered as the identifiers of the sessions, it is possible to recognize each session even if there is an IP address which is redundantly used. The packets passing the abnormal traffic detecting unit 56 are input to the redundant IP detecting unit 210.

Figure 12:
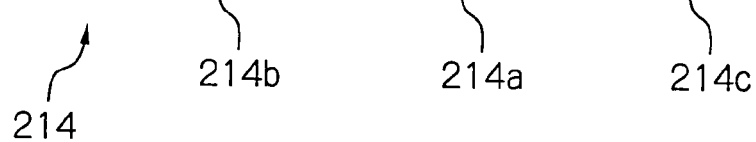
FIG. 12 shows exemplified search table data for use in a redundant IP detecting unit in the aggregation apparatus shown in FIGS. 10A and 10B.
Figure 13:
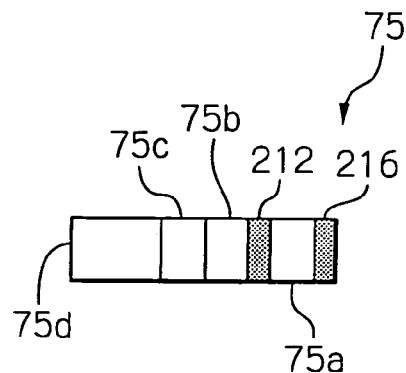
FIG. 13 is a schematic diagram showing a specific configuration of the packet shown in FIG. 10 to which an extra tag is added.

The redundant IP detecting unit 210 is adapted for detecting redundant IPs by examining the VLAN-IDs and source IP addresses of the packets. With reference to FIGS. 11 and 12, the process in the redundant IP detecting unit 210 will be described below. FIG. 12 shows a search table 214 for use in the redundant IP detecting unit 210. The search table 214 includes a VLAN-ID field 214a and a source IP address field 214b for respectively registering VLAN-IDs and source IP address, which are extracted from both the input side packets and the output side packets from the abnormal traffic detecting unit 56. The search table 214 includes a redundant flag field 214c, where redundant flags are set in accordance with the VLAN-IDs and the source IP addresses. If there are entries having the same source IP address and different VLAN-IDs, the redundant flags of these entries are set to "1" in the search table 214. Otherwise, the redundant flags are set to "0". The redundant flag is concatenated to each packet as a proprietary tag (extra tag) 216. FIG. 13 schematically shows an embodiment of the packet 75 to which the extra tag 216 is concatenated. The search table 214 is cleared and updated at predetermined intervals. While the redundant flag is set to either "0" or "1", it is possible to make settings through the management unit 70 such that the extra tag is always set to "0".

Figure 14A:
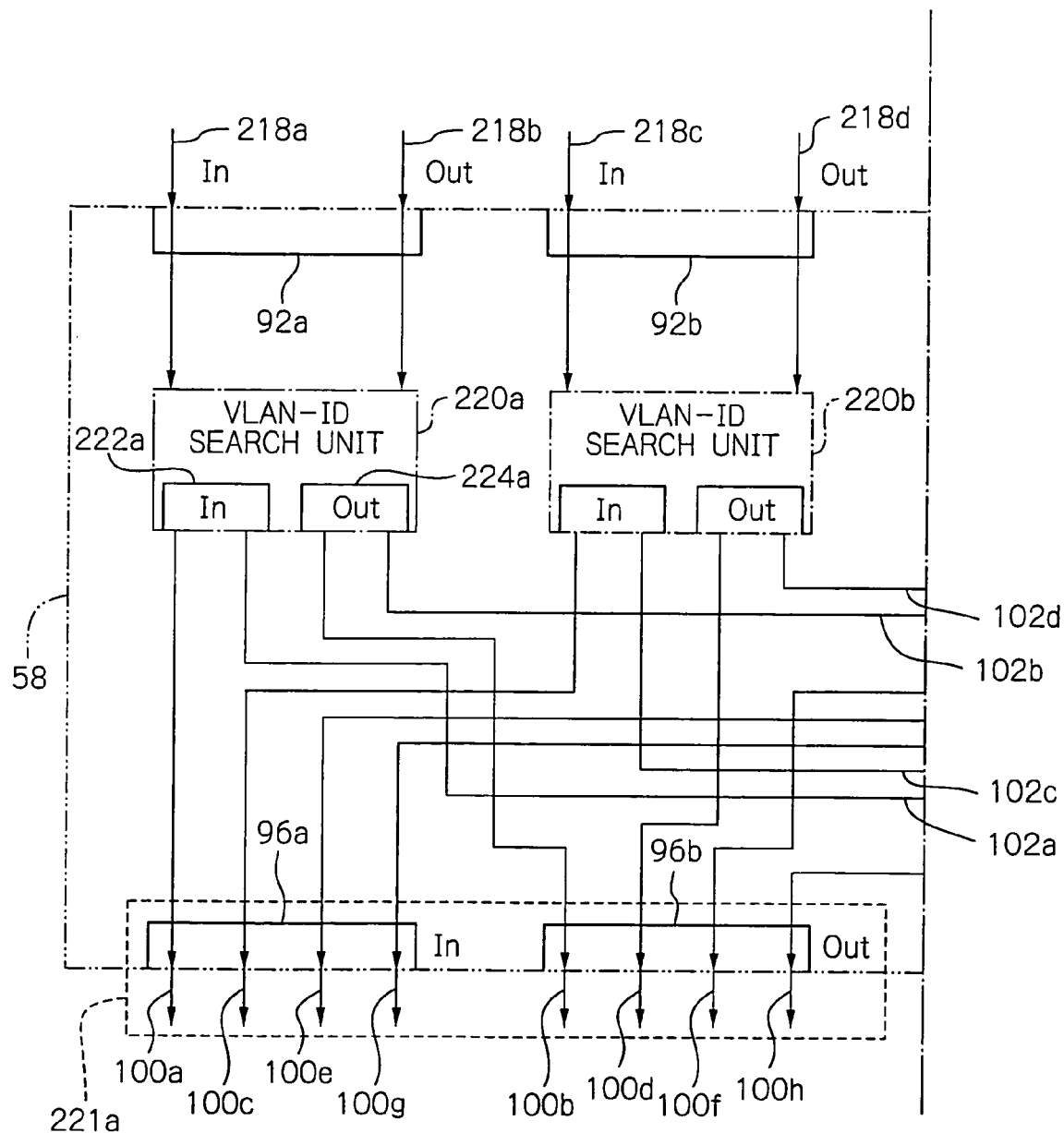
FIGS. 14A and 14B, when combined as shown in FIG. 14, schematically show a specific configuration of VLAN-ID (Virtual Local Area Network-IDentification) search units of the switch unit of the aggregation apparatus shown in FIGS. 10A and 10B.
Figure 14B:
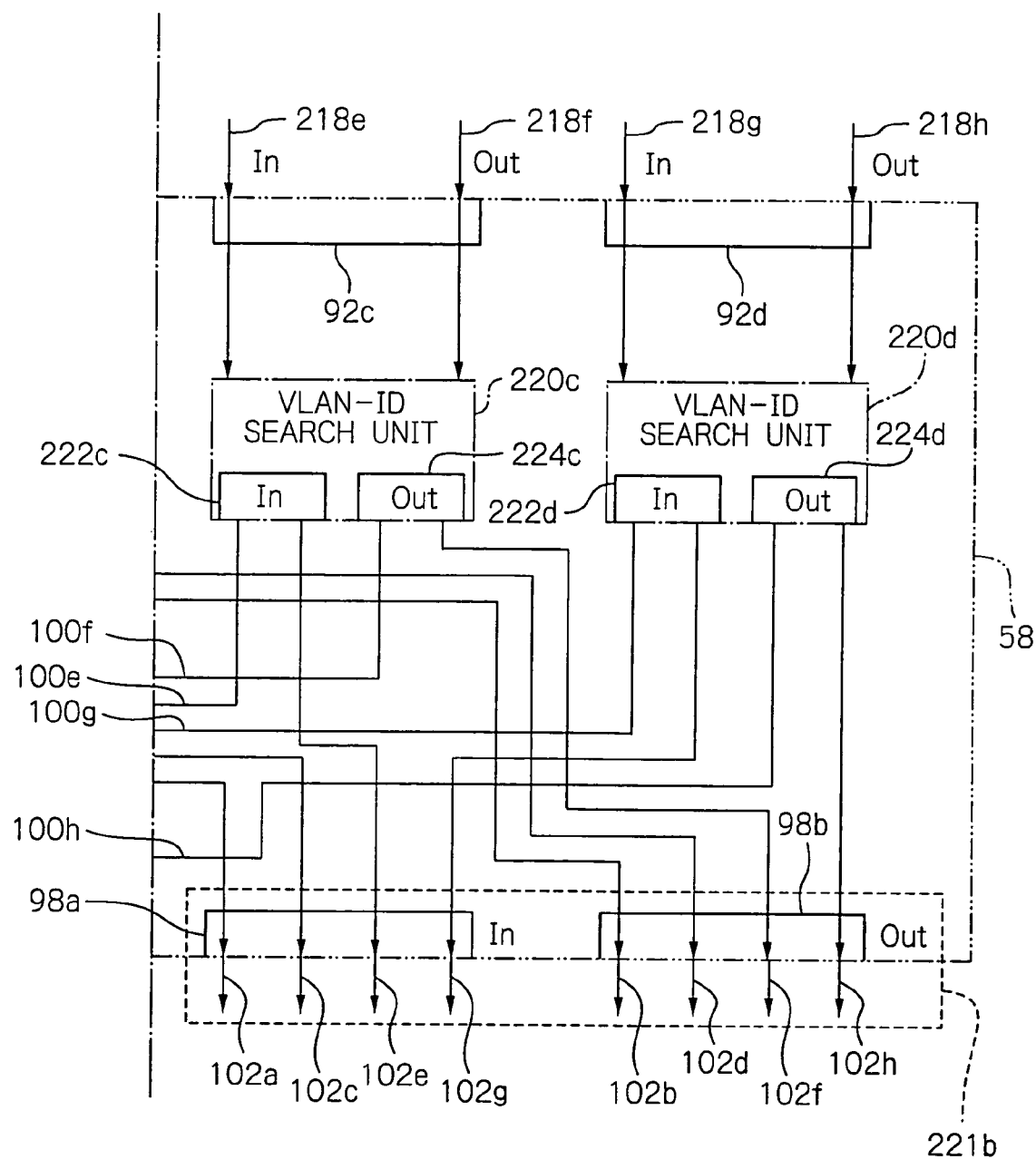

The packets passing the redundant IP detecting units 210 are transferred to the input ports of the switch unit 58. The switch unit 58 is operable to search input packets for VLAN-IDs and perform switch operation in accordance with presettings. FIGS. 14A and 14B are a schematic block diagram showing the configuration of the switch unit 58. The switch unit according to the embodiment does not include the switch elements but VLAN-ID search units 220a, 220b, 220c and 220d, which will be sometimes indicated with a common reference numeral 220. The switch unit 58 serves to connect the input ports on the network side to the output ports on the monitoring side through the VLAN-ID search units 220a, 220b, 220c and 220d. It is determined on the basis of the VLAN-ID search result which output port will serve the packet supplied to the switch unit 58.

Figures 15A, 15B, 15C:
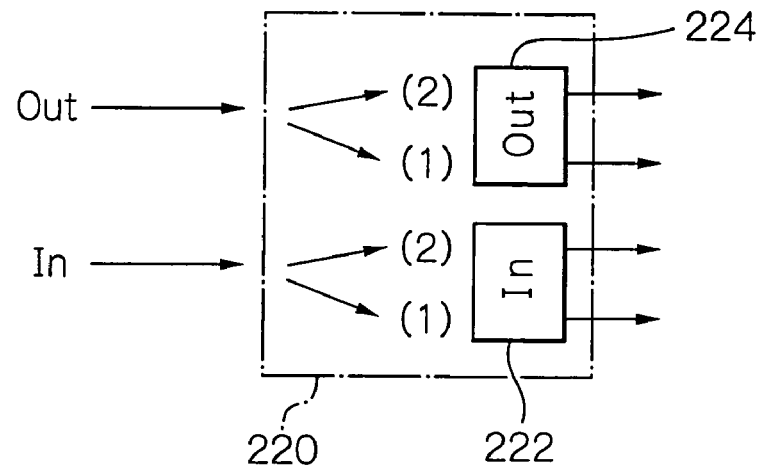
FIG. 15A shows a schematic configuration of the VLAN-ID search unit shown in FIG. 14.
FIG. 15B shows an example of extra tags for detecting an output port to which a packet input into the VLAN-ID search unit will be supplied.
FIG. 15C shows a VLAN-ID table format for detecting an output port to which the packet input to the VLAN-ID search unit will be supplied.

With reference to FIGS. 15A, 15B and 15C, the process in the VLAN-ID search unit will be described. FIG. 15A schematically shows a configuration of a specific embodiment of the VLAN-ID search unit 220 according to the alternative embodiment. Each VLAN-ID search unit 220 includes two connectors 222 and 224. The connectors 222 include a $1^{st}$ and a $2^{nd}$ connectors which respectively connect to output ports 96a and 98b. The connector 224 includes a $1^{st}$ and a $2^{nd}$ connectors which respectively connect to the output ports 96b and 98b. The VLAN-ID search units 220a, 220b, 220c and 220d respectively receive input side packets and output side packets 218a and 218b, 218c and 218d, 218e and 218f, and 218g and 218h.

FIGS. 15B and 15C show extra tag table 230 and a VLAN-ID table 232 for use in the VLAN-ID search unit 220. In this embodiment, the output ports 96a and 96b are sometimes referred to as a $1^{st}$ port unit, and 98a and 98b are as a $2^{nd}$ port unit.

The VLAN-ID search unit 220 extracts the VLAN-ID and extra tag from each packet, and searches an extra tag table 230 with the extra tag as a key. The extra tag table 230 is set up with values registered by the management unit 70 in advance. If the extra tag is "1", the packet is output to the output port which is designated in accordance with the search result of the extra tag table 230. In the case shown in FIG. 15B, since the $2^{nd}$ output port is designated if the extra tag is "1", the packet, either input side or output side, is output to the output port 98a or 98b.

If the extra tag is "0", a VLAN-ID table 232 is searched with the VLAN-ID as a key. The VLAN-ID table 232 is set up with values registered by the management unit 70 in advance in the same manner as the extra tag table 230. As a result of searching the VLAN-ID table 232 shown in FIB. 15C, the packet is output to the output port which is designated in accordance with the value of the VLAN-ID. If both the $1^{st}$ and $2^{nd}$ output ports are designated, the packet is output to both the output ports 96a and 98a, or 96b and 98b by copying. When the packet is output from the VLAN-ID search unit 220, the extra tag is deleted.

FIG. 16 is a schematic block diagram showing the configurations of the management unit 70 and the management apparatus 42. In the configuration of the management unit 70 shown in FIG. 16, a setter 234 is provided for the redundant IP detecting (RIPD) unit 210, in addition to the configurations shown in FIG. 8. The RIPD setter 234 is adapted for receiving information 236 supplied to it and converting the internal formats of the information items to appropriate formats which can be used in the management apparatus 43 and vice versa. The redundant IP detecting unit 210 is set up by the RIPD setter 234 of the management unit 70.

As has been discussed above, in accordance with the alternative embodiment, even when redundant IP addresses are used for multiplexing by the use of VLAN, it is possible to monitor the traffic by network analyzers, which may not support redundant IP addresses, by detecting redundancy in the aggregation apparatus 100 and dispatching the packets to the respective network analyzers in accordance with the redundancy.

While subscribers under the same contract of the V-LAN service may use a plurality of communication lines, subscribers under different contracts may be multiplexed in the communication lines. In such a case it is possible to aggregate the traffic of the subscribers of the same VLAN on a single network analyzer by designating output ports for the respective VLAN-IDs. In addition to this, when detecting abnormal traffic, it is possible to recognize each session even if there is an IP address which is redundantly used.

The entire disclosure of Japanese patent application No. 2007-255239 filed on Sep. 28, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A network monitoring system connectable to an access network which is connected to a telecommunications network, comprising:

a receiving unit for distinctively receiving input side communication data which is input to the access network from the telecommunications network, and output side communication data which is output from the access network to the telecommunications network; and an abnormal traffic detecting unit for detecting abnormal traffic on a basis of both the input side communication data and the output side communication data, wherein, when a number of nearby sessions, which are registered after one second before, or a number of concurrent sessions has reached a predetermined upper limit, said abnormal traffic detecting unit detects the abnormal traffic and discards the communication data corresponding to the abnormal traffic.

2. A network monitoring system connectable to an access network which is connected to a telecommunications network, comprising:

a receiving unit for distinctively receiving input side communication data, which is input to the access network from the telecommunications network, and output side communication data, which is output from the access network to the telecommunications network;

an abnormal traffic detecting unit for detecting abnormal traffic on a basis of both the input side communication data and the output side communication data; and a redundant IP (Internet Protocol) detecting unit for detecting whether or not an IP address is redundantly used on the basis of a source IP address and a VLAN-ID (Virtual Local Area Network-IDentification) contained in the communication data, and adding an extra tag to the communication data if an IP address is redundantly used.

3. The system as claimed in claim 2, further comprising:

a plurality of monitoring apparatuses for monitoring the traffic of the telecommunications network; and a switch unit for determining one of said monitoring apparatuses, to which the communication data is to be output, on the basis of the extra tag added to the communication data and the VLAN-ID contained in the communication data.

4. A method of monitoring a telecommunications network, comprising the steps of:

distinctively receiving input side communication data, which is to an access network input from the telecommunications network, and output side communication data, which is output from the access network to the telecommunications network; and recognizing a session in both the input side communication data and the output side communication data, and detecting abnormal traffic on a basis of the recognized session, wherein, in said abnormal traffic detecting, when a number of nearby sessions, which are registered after one second before, or the number of concurrent sessions has reached a predetermined upper limit, the abnormal traffic is detected, and the communication data corresponding to the abnormal traffic is discarded.

5. A method of monitoring a telecommunications network, comprising:

distinctively receiving input side communication data, which is input to an access network from the telecommunications network, and output side communication data, which is output from the access network to the telecommunications network;

recognizing a session in both the input side communication data and the output side communication data;

detecting abnormal traffic on a basis of the recognized session;

detecting whether or not an IP (Internet Protocol) address is redundantly used on the basis of a source IP address and a VLAN-ID (Virtual Local Area Network-IDentification) contained in the communication data; and adding an extra tag to the communication data if an IP address is redundantly used.

6. The method as claimed in claim 5, further comprising:

monitoring the traffic of the telecommunications network by a plurality of monitoring apparatuses; and determining one of the monitoring apparatuses, to which the communication data is to be output, on the basis of the extra tag added to the communication data and the VLAN-ID contained in the communication data.

7. The system as claimed in claim 1, wherein said abnormal traffic detecting unit includes a session processing unit for recognizing a session in both the input side communication data and the output side communication data; and a signature storing unit for storing a signature registered to indicate abnormal communication data, said abnormal traffic detecting unit comparing the signature with the input side communication data and the output side communication data for each session to detect the abnormal traffic.

8. The system as claimed in claim 2, wherein said abnormal traffic detecting unit includes a recognizing unit for recognizing a session in both the input side communication data and the output side communication data, and a signature storing unit for storing a signature registered to indicate abnormal communication data, said abnormal traffic detecting unit comparing the signature with the input side communication data and the output side communication data for each session to detect the abnormal traffic.

9. The method as claimed in claim 4, wherein said abnormal traffic detecting includes detecting the abnormal traffic by comparing a signature indicative of abnormal communication data with the input side communication data and the output side communication data for each session.

10. The method as claimed in claim 5, wherein said abnormal traffic detecting includes the detecting abnormal traffic by comparing a signature indicative of abnormal communication data with the input side communication data and the output side communication data for each session.

* * * * *